United States Patent [19]

Shigematsu et al.

[11] Patent Number: 5,439,096
[45] Date of Patent: Aug. 8, 1995

[54] DOUGH SLICE CONVEYING APPARATUS

[75] Inventors: Teruo Shigematsu, Sano; Iwami Hirota, Tochigi, both of Japan

[73] Assignee: House Food Industrial Co., Ltd., Higashi-Osaka, Japan

[21] Appl. No.: 297,099

[22] Filed: Aug. 26, 1994

Related U.S. Application Data

[63] Continuation of Ser. No. 40,007, Mar. 30, 1993, abandoned.

[30] Foreign Application Priority Data

Oct. 27, 1992 [JP] Japan .................. 4-288914

[51] Int. Cl.⁶ ............................................. B65G 47/57
[52] U.S. Cl. ...................................... 198/606; 198/601; 198/586; 425/403.1; 425/DIG. 108
[58] Field of Search ............... 198/841, 594, 586, 606, 198/837, 601; 425/371, 403.1, 315, DIG. 108; 426/503, 518

[56] References Cited

U.S. PATENT DOCUMENTS

| | | | |
|---|---|---|---|
| 3,127,854 | 4/1964 | Reisman | 198/841 |
| 3,482,675 | 12/1969 | Hutz | 198/586 |
| 3,517,925 | 6/1970 | Hutz | 198/686 |
| 3,933,068 | 1/1976 | Rejsa | 198/841 |
| 4,155,441 | 5/1979 | Albrecht et al. | 198/431 |
| 4,684,008 | 8/1987 | Hayashi et al. | 198/431 |
| 4,724,953 | 2/1988 | Winchester | 198/841 |
| 4,741,916 | 5/1988 | Heidel et al. | 426/503 |
| 4,809,575 | 3/1989 | Swanson | 198/431 |
| 5,077,074 | 12/1991 | Van Lengerich | 426/503 |

FOREIGN PATENT DOCUMENTS

| | | |
|---|---|---|
| 0591670 | 4/1994 | European Pat. Off. . |
| 632727 | 7/1936 | Germany . |
| 678019 | 7/1939 | Germany . |
| 2841981 | 4/1980 | Germany . |

*Primary Examiner*—Khanh P. Nguyen
*Attorney, Agent, or Firm*—Popham, Haik, Schnobrich & Kaufman, Ltd.

[57] ABSTRACT

Provided is a dough slice conveying apparatus in which a dough slice can peel off from the reversing part in the terminal of a front side conveyer belt without being deformed and without being dropped between the front side conveyer belt and the rear side conveyer belt, and is then transferred onto and conveyed by the rear side conveyer belt without being folded but in an unfolded condition. The dough slice conveying apparatus is provided with a knife edge having a front end part whose curvature is 2.1T to 11.7T where T is a thickness of the dough slice, and the space between the reversing part in the terminal of the front side conveyer belt and the reversing part in the start end of the rear side conveyer belt is set to less than 0.1R where R is a minimum diameter of the dough slice.

6 Claims, 2 Drawing Sheets

DOUGH SLICE CONVEYING APPARATUS

This is a continuation of U.S. patent application Ser. No. 08/040,007, filed Mar. 30, 1993 now abandoned.

BACKGROUND OF THE INVENTION

The present invention relates to a dough slice conveying device for conveying dough slices, that is, formed food material which have been formed in a predetermined shape by punching dough of a food material and so forth, from a dough forming station to a next station to carry out processing such as drying or the like.

DESCRIPTION OF RELATED ART

Conventionally in a dough slice conveying apparatus in which dough slices or formed food material are transferred from a sheet-like front side conveyer belt onto a rear side conveyer belt and conveyed, the curvature of the front end part of a reversing part of the above-mentioned conveyance terminal of the front side conveyer belt has been about 13 T, irrespective of thickness T and outer diameter of the dough slices. Further, the space between the reversing part of the conveyance terminal of the front side conveyer belt and a reversing part of the conveyance start end of the rear side conveyer belt has been about 0.2 R where R is a minimum diameter of the dough slices or the formed food material, irrespective of thickness T and outer diameter of the dough slices.

SUMMARY OF THE INVENTION

The above-mentioned conventional dough slice conveying apparatus have offered problems such that, sometimes a dough slice does not peel off from the front side conveyer belt or even though it peels off, it is deformed, in a large warp so forth, or it is not transferred onto the rear side the rear side conveyer being deformed, and then can be transferred onto a rear side conveyer belt without being dropped between the front and rear side conveyer belts and without being folded, so that the dough slice can be conveyed satisfactorily in an unfolded condition. The present invention to achieve the above mentioned object.

To the end according to the present invention, in a dough slice conveying apparatus in which a dough slice having a thickness T and a minimum outer diameter R is transferred from a sheet-like front side conveyer belt onto a rear side conveyer belt, characterized in that a knife-edge having a front end part curvature of 2.1 T to 11.7 T is arranged in a reversing part in the terminal of the front side conveyer belt, and a space between the reversing part in the terminal of the front side conveyer belt and the reversing part in the start end of the rear side conveyer belt is set to less than 0.1 R. Incidentally, the above-mentioned curvature of the front end part corresponds to a radius of the front end part of the knife edge.

Embodiment of the present invention regarding the dough punching device including dough slice conveying apparatus will be explained with reference to the accompanying drawings in which:

DESCRIPTION OF PREFERRED EMBODIMENTS

Figure 1:
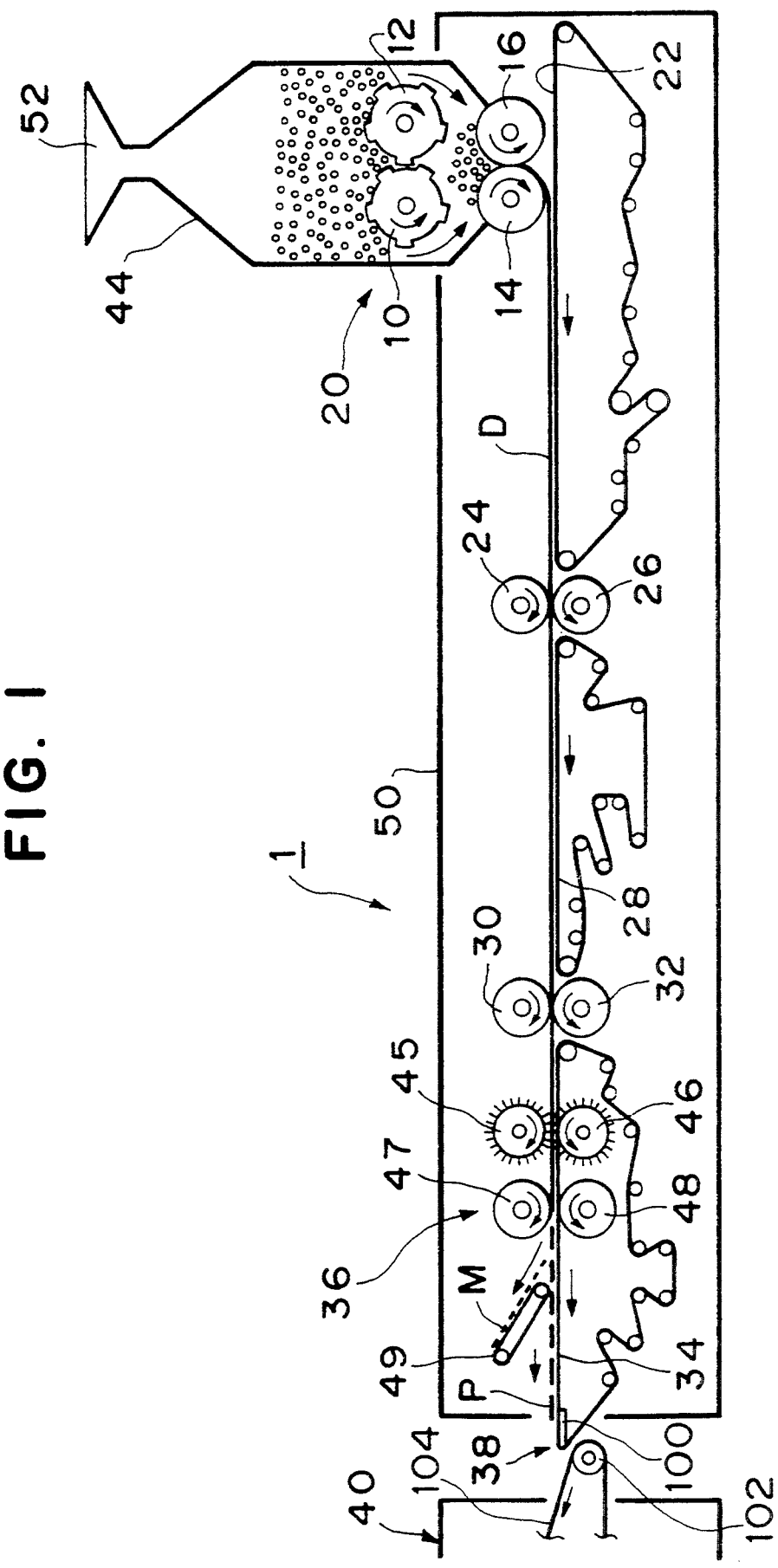
FIG. 1 is a sectional view illustrating a dough punching device incorporating a dough slice conveying apparatus in one embodiment of the present invention.

Explanation will be made below of a dough punching device including a dough slice conveying apparatus in one embodiment of the present invention with reference to the drawings. Referring at first to FIG. 1, the dough slicing device 1 is composed of a dough supplying and rolling portion 20 having a pair of material discharge rollers 10, 12 and a pair of first dough rolling rollers 14, 16, a first conveyer 22, second dough rolling rollers 24, 26, a second conveyer belt 28, third dough rolling rollers 30, 32 and a forming portion 36 for punching out a food material having a predetermined shape from a dough material while conveying by a third conveyer belt 34. In front of a delivery part 38 in the forming portion 36, there is provided a drying device 40 for drying a punched-out material piece, which is connected to the delivery part 38.

The dough supplying and rolling portion 20 comprises a charging port 52 provided above a housing 50, through which a granular dough material is charged, and a hopper 44 for feeding the charged dough material to the material discharge rollers 10, 12 and the first dough rolling rollers 14, 16.

The forming portion 36 comprises a pair of docker brushes with its outer surfaces planted with bristles to form countless small holes on the surfaces of a rolled food material D, a pair of cutter rollers 47, 48 for punching the rolled food material D so as to produce a formed food material piece P having a predetermined shape, and a residue take-up conveyer belt 49 for extracting a residue M obtained by punching out the formed food material piece P from the rolled food material D, from the third conveyer belt 34. The residue take-up conveyer 9 conveys the residue M toward a dough reusing station which is not shown.

Figure 2:
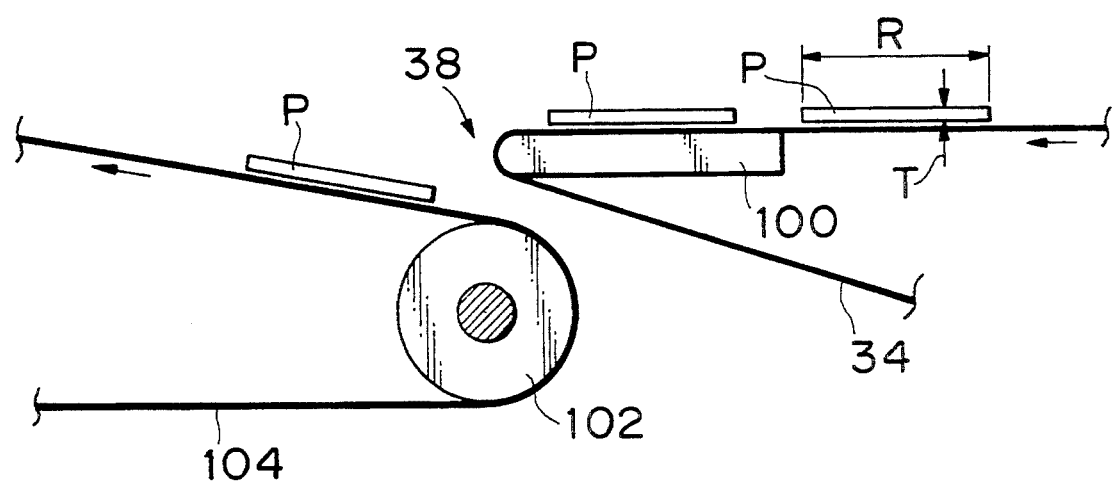
FIG. 2 is an enlarged side vied illustrating the dough slice conveying apparatus shown in FIG. 1.

Referring to FIG. 2 which shows a detailed structure of the conveying portion 38, a knife edge 100 with a front end part curvature of 2.1 T to 11.7 T when the thickness of the formed food material piece P is 0.6 to 0.7 mm, that is, the curvature is from 1.5 to 7 mm, is arranged and the third conveyer belt 34 runs around the knife edge 100. In the drying device 40, a fourth conveyer belt 104 runs around a conveyer roller 102 having a diameter of 80 mm. If a minimum diameter R of the formed food material piece P is 50 to 60 mm, the space between the third conveyer belt 34 and the fourth conveyer belt 104 both being between the knife edge 100 and the conveyer roller 102 is less than 0.1 R, that is, in a range from 4 to 5 mm.

If the front end is greater than 0.1 R, the formed food material piece is bent between the third conveyer belt 34 and the fourth conveyer belt 104, accordingly, the formed food material piece P cannot be uniformly baked when it is subjected to drying and heating process, therefore, it loses its commercial value.

The present invention can offer a technical effect and advantage such that a dough slice can readily peel off from the reversing part in the terminal end part of a front side conveyer belt, and then transferred onto the rear side conveyer belt and conveyed in an unfolded condition, without being dropped between the front and rear conveyer belts and without being folded but open.

What is claimed is:

1. A conveying apparatus for conveying pieces of a dough-like product having a thickness of T and a minimum diameter R, wherein T is between 0.6 and 0.7 mm and R is between 50 and 60 mm, said conveying apparatus comprising:

a front side conveyor belt for carrying pieces of the dough-like product, said front side conveyor belt having a terminal having a reversing part, said reversing part having a knife edge, said knife edge having a front end part curvature of between 2.1 T and 11.7 T; and a rear side conveyor belt extending downstream of said front side conveyor belt for receiving pieces of the dough-like product from said front side conveyor belt, said rear side conveyor belt having a start end part having a reversing part, said start end part being located beneath and opposite to said terminal of said front side conveyor; and said reversing part of said terminal of said front side conveyor belt and said reversing part of said start end part of said rear side conveyor belt having a space between them of less than 0.1 R.

2. The conveying apparatus of claim 1, wherein either one of said front side conveyor belt and rear side conveyor belt is a net conveyer belt.

3. The conveying apparatus of claim 1, wherein either one of said front side conveyor belt and rear side conveyor belt is a sheet-like conveyor belt.

4. A conveying apparatus for conveying pieces of a dough-like product having a thickness between 0.6 and 0.7 mm and a minimum diameter between 50 and 60 mm, said conveying apparatus comprising:

a front side conveyor belt for carrying pieces of the dough-like product, said front side conveyor belt having a terminal having a reversing part, said reversing part having a knife edge, said knife edge having a front end part curvature of between 1.5 and 7 mm; and a rear side conveyor belt extending downstream of said front side conveyor belt for receiving pieces of the dough-like product from said front side conveyor belt, said rear side conveyor belt having a start end part having a reversing part, said start end part being located beneath and opposite to said terminal of said front side conveyor; and said reversing part of said terminal of said front side conveyor belt and said reversing part of said start end part of said rear side conveyor belt having a space between them of between 4 and 5 mm.

5. The conveying apparatus of claim 4, wherein either one of said front side conveyor belt and rear side conveyor belt is a net conveyer belt.

6. The conveying apparatus of claim 4, wherein either one of said front side conveyor belt and rear side conveyor belt is a sheet-like conveyor belt.

* * * * *